United States Patent [19]
Carter

[11] Patent Number: 4,492,554
[45] Date of Patent: Jan. 8, 1985

[54] VALVE UNIT FOR A MOLD VENT

[75] Inventor: Russell W. Carter, Des Moines, Iowa

[73] Assignee: Corn States Metal Fabricators, Inc., Des Moines, Iowa

[21] Appl. No.: 499,672

[22] Filed: Jun. 3, 1983

Related U.S. Application Data

[63] Continuation of Ser. No. 363,037, Mar. 29, 1982, abandoned, which is a continuation-in-part of Ser. No. 181,461, Aug. 20, 1980, Pat. No. 4,347,212.

[51] Int. Cl.³ .............................................. B29H 5/02
[52] U.S. Cl. ................................. 425/383; 425/28 R; 425/390; 425/812
[58] Field of Search .................... 425/28 R, DIG. 812, 425/522, 387.1, 405 R, 388, 390

[56] References Cited

U.S. PATENT DOCUMENTS 3,854,852 12/1974 Carter ............................ 425/812 X
3,885,618 5/1975 Hodler ........................... 425/812 X

FOREIGN PATENT DOCUMENTS 2353247 4/1975 Fed. Rep. of Germany ... 425/812 X
50-36875 11/1975 Japan ............................... 425/812 X
922788 4/1963 United Kingdom ........... 425/812 X Primary Examiner—Jan Silbaugh
Attorney, Agent, or Firm—Rudolph L. Lowell

[57] ABSTRACT

Separable mold sections of a tire forming machine are brought together to form a tire cavity within which a preformed tire band is continuously expandable toward and against the inner surface of the cavity side wall. During the tire shaping operation, air is forced by the expanding tire band from the cavity and into the atmosphere through vents having vent opening and closing valve units. As the expanding tire band moves into conforming engagement with the inner surface of the cavity side wall, the final residual air in the cavity is forced therefrom concurrently with the valve units at the terminal cavity ends of the vents being engaged and moved by the expanding tire band to vent closing positions wherein the velve units form a smooth surface continuous with the inner surface of the tire cavity.

7 Claims, 10 Drawing Figures

VALVE UNIT FOR A MOLD VENT

This application is a continuation of application Ser. No. 363,037, filed Mar. 29, 1982, now abandoned, which is a continuation-in-part of application Ser. No. 181,461, filed Aug. 20, 1980, now issued as U.S. Pat. No. 4,347,212.

BACKGROUND OF THE INVENTION

In the forming of vehicle tires it is desirable that the tire side wall be free of any radially projected rubber pins, impressions or other surface irregularities. The forming of the pins is usually the result of the tire band, in the final forming operation, being forced into the air release vents or passages which have terminal ends open to the inner surface of the tire forming cavity of the molding machine. For economical purposes, the pins are not removed and thus give to the tire an unfinished appearance. The forming of cavities or depressions in the tire wall not only deface the tire but provide pockets for road dirt accumulations. In any event, where vehicles are on display, the pins or side wall blemishes detract not only from the overall appearance of the tire but also from the overall appearance of the vehicle.

Attempts to avoid surface irregularities on the tire side wall have been made particularly with regard to avoiding the necessity and resultant expense of removing the rubber pins from the finished tire. In the case of side wall depressions or the like surface irregularities, such are left untouched and thus permanently deface the finished tire. One attempt to eliminate the rubber pins is shown in British Pat. No. 922,788, issued Apr. 3, 1963, wherein there is disclosed a one piece valve body extended within a mold aperture and movable by an expanding tire band into an aperture closing position. The valve is not movable to a full open position and is apparently limited in operation to horizontally extended apertures so that the depressions formed in the tire tread appear as part of the tread.

In U.S. Pat. No. 4,021,168, bent nails having one or more washers positioned between the nail head and the face of the mold are inserted into the vents or passages of the tire mold. Rubber protrusions are prevented from forming in the vents during a mold operation and air is permitted to escape. However, the nail head and washer assembly form depressions over the entire tread and tire side wall surfaces.

The tire forming method of U.S. Pat. No. 3,842,150 provides for the forming of a tire having smooth side walls which are free of any radially protruding rubber pins or surface irregularities. The release of air from the tire cavity through vents, having terminal ends open to the tire cavity side wall, is controlled by valves which are actuated in response to the selective application thereon of air under pressure and sub-atmospheric air. Although this method performs satisfactorily, appreciable time and resultant expense are involved in the forming of the various valve structures and air vents, and the control system for controlling the flow of air through the vents to actuate the valves in synchronism with the tire forming operation.

SUMMARY OF THE INVENTION

The valve unit of this invention for venting a tire mold is readily applicable to present commercially available and existing tire forming machines without requiring any extensive machining of the mold to accommodate the valve units which are located in the cavity ends of the vents. The valve member of the valve unit is arranged within a vent passage such that each valve member is yieldably retained in an open position and movable to a closed position, by the continuously expanding tire band, so that when the tire band is in a final expanded condition, the valve member forms a surface continuous with the tire cavity side surface of the mold. The valve unit is thus positively closed by the expanding tire band and on removal of the formed tire is automatically returned to a normal open position permitting an unobstructed flow of air through the air vent. Machining and operating costs are thus reduced to a minimum along with the elimination of any tire surface irregularities so that the formed tire may be immediately used commercially or for show and display purposes without requiring any further attention or preparation.

DETAILED DESCRIPTION OF THE INVENTION

Figure 1:
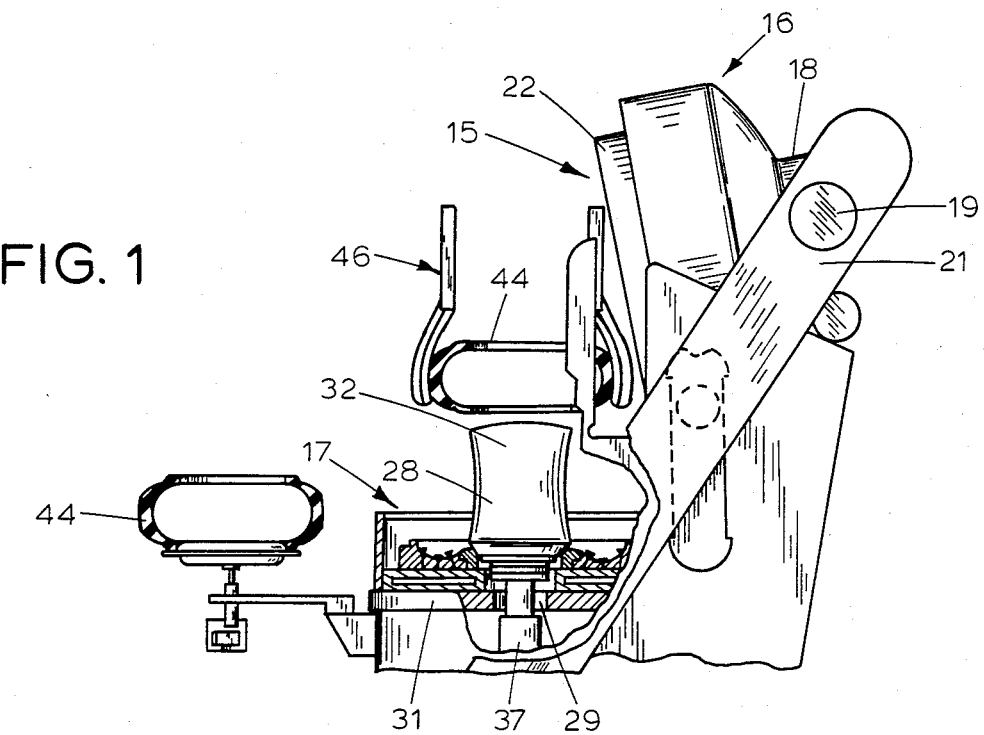
FIG. 1 is a fragmentary side elevation, with parts broken away and other parts shown in section, illustrating the tire mold sections of a tire forming machine in open position to receive a tire band with the valve units in vent opening positions.
Figure 2:
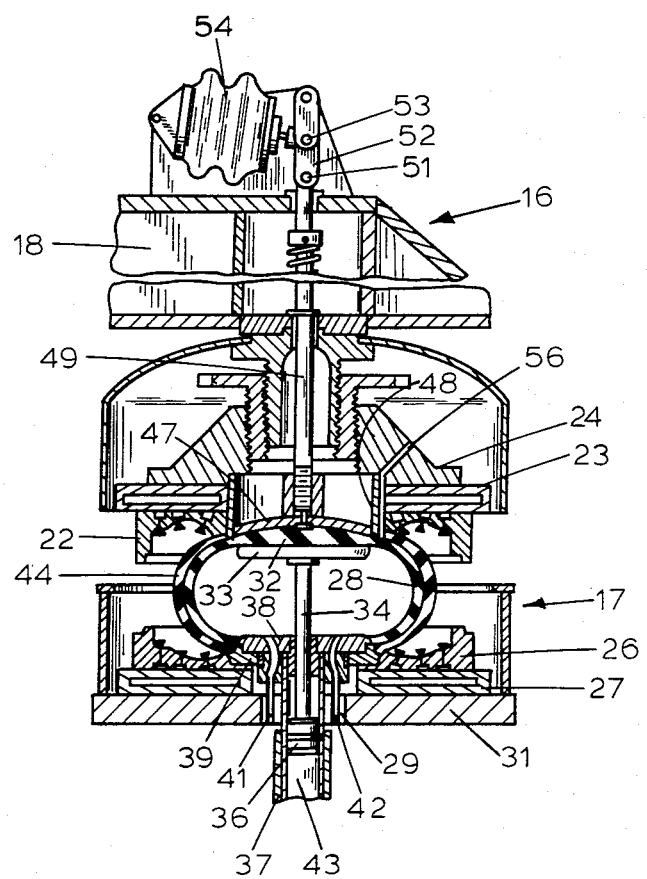
FIG. 2 is a sectional view of the tire forming machine showing the mold sections in partly closed positions and the bladder partially expanded within the tire band.

Referring to FIG. 1 of the drawings, there is illustrated a tire forming machine, indicated generally as 15, and including upper and lower mold assemblies 16 and 17, respectively, wherein the upper mold assembly is movable toward and away from the lower mold assembly to relative closed and open positions, also respectively. The upper mold assembly is secured to the under side of a cross head 18 which extends across the machine and forms part of the operating mechanism for moving the upper mold assembly 16 relative to the lower mold assembly 17. Each end of the cross head 18 has a bearing 19 mounted at the upper end of a corresponding link 21 which are actuated through a motor driven gear system (not shown) to raise and lower the cross head 18. An upper mold member 22, which forms part of the upper mold assembly 16 is secured to the underside of an upper heating platen 23 that is attached to a head member 24 (FIG. 2).

The lower mold assembly 17 (FIG. 2) includes a lower mold member 26 carried on the upper side of a lower heating platen 27. An operating mechanism for a tire shaping diaphragm or bladder 28, located axially of the lower mold member 26, extends through a central opening 29 formed in a base plate 31. The bladder 28 is radially distensible and in a normal non-distended condition is of a generally cylindrical shape, as shown in FIG. 1. The closed upper end or top wall 32 of the bladder has the lower or inner side thereof engageable by an actuating plate 33 which is carried at the free end of a piston rod 34, movable by a floating piston 36 that is reciprocally movable within a cylindrical tube 37 positioned axially of the central opening 29 in the base plate 31. The lower open side of the bladder 28 is closed by a flat plate 38 and a cooperating clamping ring 39. As shown in FIG. 2, the plate 38 slidably receives the piston rod 34 and is formed with passages for connection with fluid lines 41 and 42, hereinafter referred to as pressure and blow down lines, respectively.

On the admission of fluid under pressure into a cylinder 43, the actuating plate 33 engages and raises the closed upper end 32 of the bladder 28 to extend the bladder to its FIG. 1 axially extended position to a height determined by the engagement of the piston 36 with the underside of the plate member 38. With the bladder in an axially extended position and the upper mold assembly 16 in the open position therefor, a partially shaped and uncured tire band 44 (FIG. 1) is arranged concentrically about the bladder and within the lower mold section 17, either manually or by a suitable loading mechanism, indicated generally at 46.

On movement of the upper mold section 22 (FIG. 2) toward a mold closing position therefor, the bladder 28 is initially distended both radially and axially into a conforming relation with the inner surface of the tire band 44. This distention is accomplished by the introduction into the line 41 of what will hereinafter be referred to as a first stage pressure fluid, concurrently with the depressing or lowering of the bladder upper wall 32 by a downward pressure exerted thereon by a pressure piston 47, reciprocally movable in a retaining cylinder 48. A push rod 49 for the pressure piston 47 has its upper end pivotally connected at 51 to a toggle linkage 52 that has a center pivot 53 connected to a pneumatic actuating unit 54 of bellows type.

On extension of the bellows 54, a substantially uniform pressure is applied downwardly on the push rod 49 against the counteracting pressure applied by the floating piston 36 on the piston rod 34. A downward movement of the push rod 49 continues until the toggle linkage 52 reaches its overcenter position shown in FIG. 2, corresponding to a position of the bladder top wall 32 at the lower end of the retaining cylinder 48. The relative positions of the bladder top wall 32 and retaining cylinder 48 are maintained on a continued movement of the upper mold member 22 to the closed position therefor, shown in FIG. 3 and thereafter during the tire forming and tire curing periods. As the final shaping operation commences, any air entrapped between the tire band 44 and the bladder 28 is vented to the atmosphere through a series of air bleed passages 56 (FIG. 2).

On completion of the tire curing period, the fluid pressure in the bladder 28 is released and the pneumatic unit 54 is actuated to move the toggle linkage 52 out of its off-center locked position to provide for an upward movement of the push rod 49 and a retraction of the pressure piston 47 within the retaining cylinder 48. On opening of the mold assemblies 16 and 17, the actuating plate 38 is elevated to axially extend the bladder 28 to its position of FIG. 1, permitting removal of the formed tire and the loading of the machine 15 with another tire band 44.

The machine 15 thus far described is of an exemplary type and other type machines can be used with the vent valve units of this invention. For a more detailed description of the machine 15, shown herein, reference is made to U.S. Pat. No. 3,298,066. In known commercial type tire forming machines, as the final shaping operation begins, any air trapped between the tire band and the tire cavity side wall is expelled to the atmosphere, usually through a plurality of air bleed passages or vents (not shown), circumferentially spaced about the mold members 22 and 26 and extended generally radially and laterally therethrough. Following this expulsion of air, the tire band 44, on final expansion thereof, is permitted to expand within such air vents whereby to form a plurality of rubber pins which, as is well known, project outwardly from the tread and side wall portions of a tire so as to detract from the over-all appearance of the tire. It is the principal object of this invention to eliminate the forming of the usual projecting rubber pins or other surface irregularities in the forming of a tire or other rubber molded article.

Figure 3:
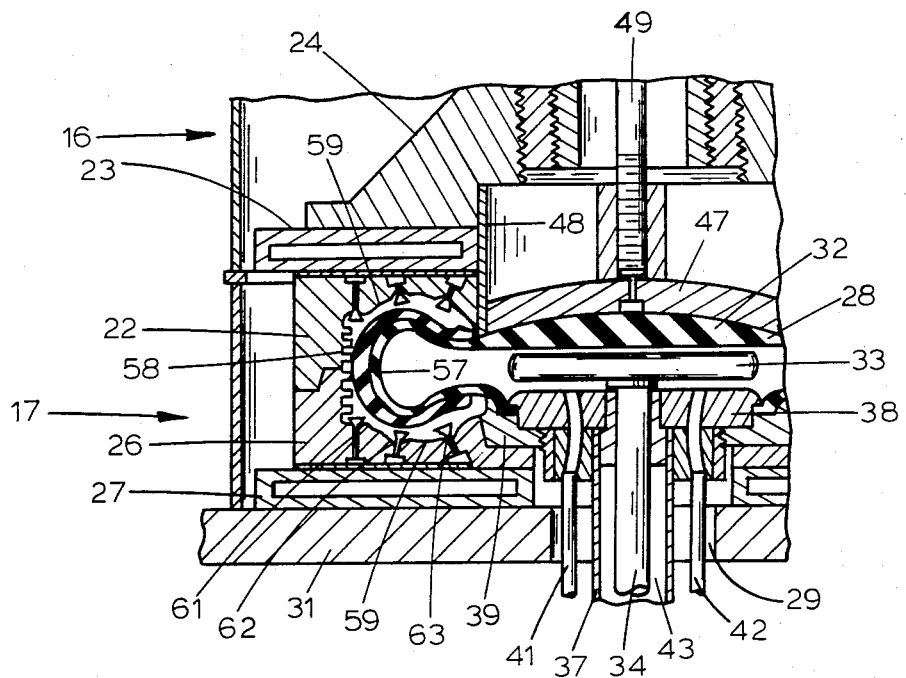
FIG. 3 is a sectional view showing in enlargement a portion of FIG. 2, with the mold section in closed position, the bladder expanded to a first stage wherein the tire band is adjacent to but spaced from the side wall of the tire cavity, and the valve units in vent opening positions.
Figure 7:
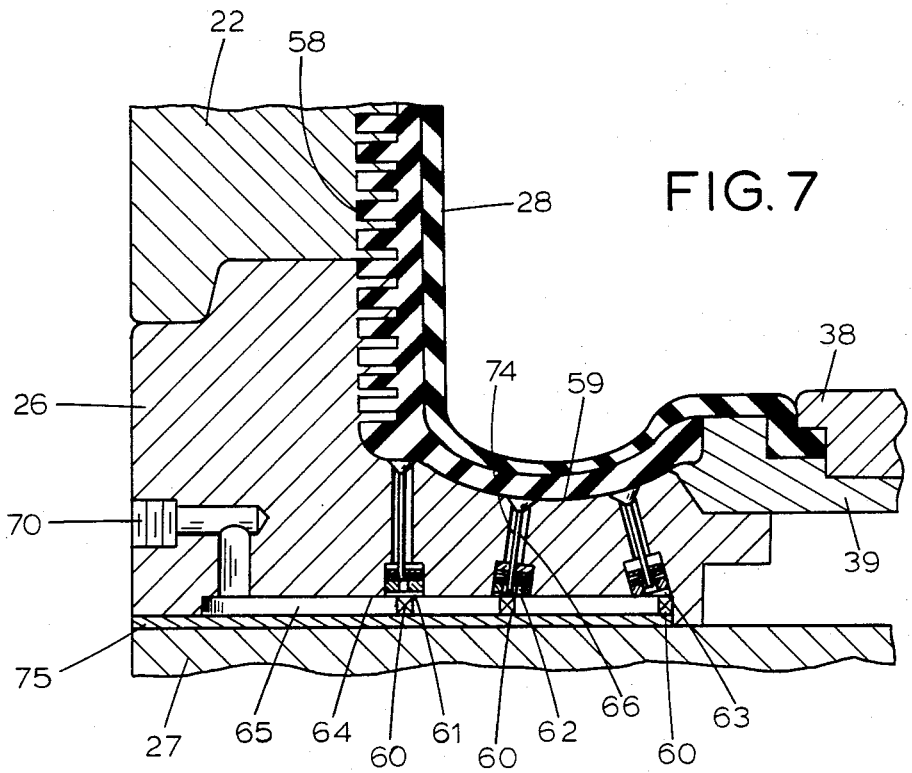
FIG. 7 is illustrated similarly to FIG. 6 and shows the tire expanded to a final forming position with the valve units in vent closing positions.

As shown in FIGS. 3 and 7, when the upper and lower mold members 22 and 26, respectively, are in their closed positions, a tire cavity 57 is formed between their inner adjacent sides which includes a tread wall section 58 and side wall sections 59. The side wall section 59 of the lower mold member 26 is formed with a series of three rows of air passages 61, 62 and 63 arranged in circles concentrically spaced about the axial center of the mold member 26 and extended laterally therethrough so as to be open to associated annular grooves 60 formed in the surface 64 of the lower mold member. The annular or circular grooves 60 are interconnected by radial grooves 65 formed in the surface 64 and open to the atmosphere at 70. The grooves 60 and 65 are closed by a cover plate 75 to form inner air passages in the bottom surface 64 of the lower mold member 26.

Figure 6:
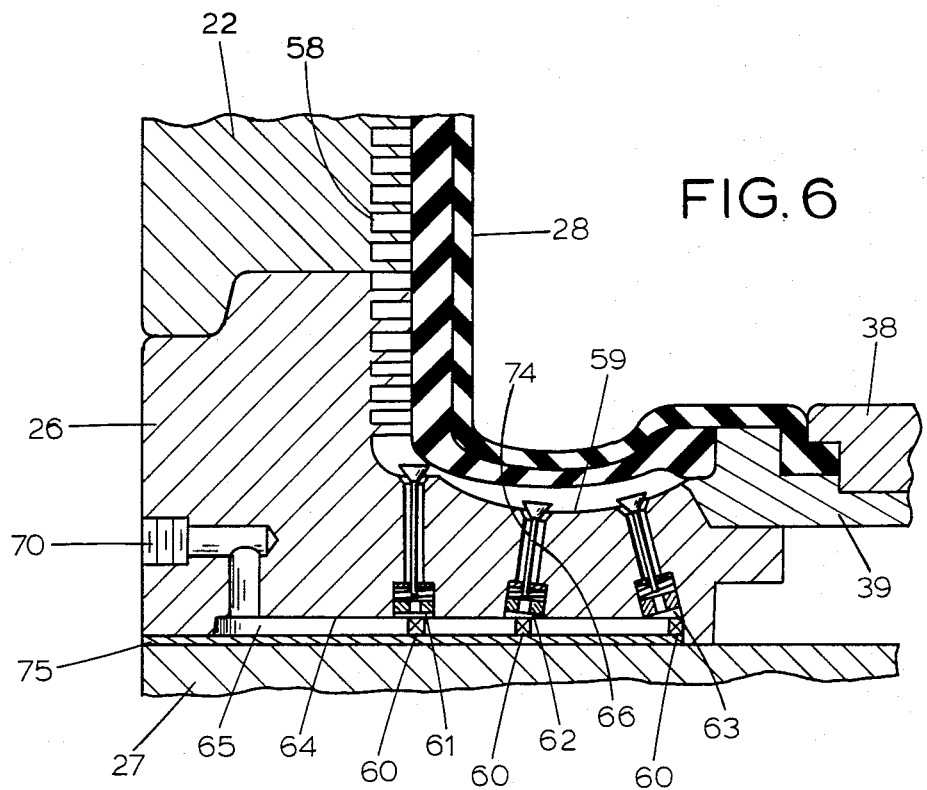
FIG. 6 is an enlarged detailed showing of the air vents and the valve units therefor that are illustrated generally in FIG. 3.

For a purpose to appear later, the passages 61, 62 and 63, in each row thereof (FIGS. 6 and 7) have the axes thereof on radii of that curved portion of the tire cavity side surface 59 in which they are located, it being seen that the curved portions form part of the continuous arcuate surface of the side wall 59. As a result, the passages 61, 62 and 63 in a row are of a different length and inclination laterally of the mold member 26 than the passages of the other two remaining rows due to their relative positions on the curved side wall surface 59 of the tire cavity 57.

Since each passage 61, 62 and 63 is of the same general shape in longitudinal section and is provided with a similarly constructed and operated air control valve unit 66, only a valve unit 66 for a passage 62 will be described in detail with like reference numerals being applied to like parts.

A passage 62 (FIG. 4) forms part of a valve unit 66 and has a first elongated section 67 with a terminal end 68 open to the cavity side wall surface 59 and an opposite end 69 open to an annular spring-receiving chamber 71 formed in the lower mold member 26 in axial alignment with the passage section 67. The terminal end 68 of the passage 62 is formed with a valve seat 72 and the junction of the opposite end 69 thereof with the chamber 71 is defined by a shoulder 73. A valve member 74 has a stem 76 extended axially of and within the passage 62 and chamber 71 and a valve head 77 for seating engagement with the seat 72. The valve head is normally held out of a seated engagement with the seat 72 by a coil spring 78 mounted about that portion of the stem 76 within the chamber 71 and arranged in compression between a washer or stop member 79 and a plug 81 threadable within the open end of the chamber 71.

Figure 5:
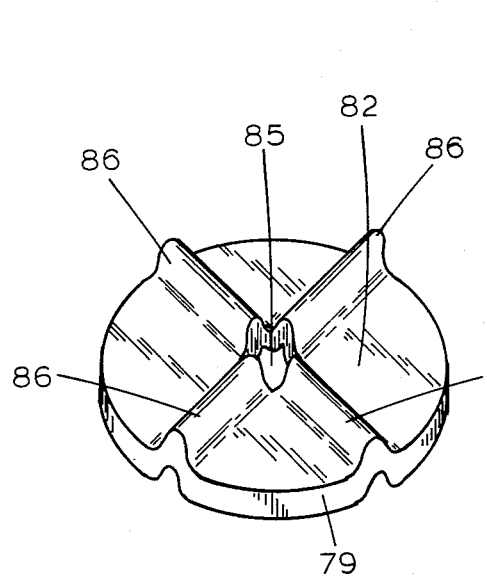
FIG. 5 is an enlarged perspective view of a stop member that forms part of the valve unit in FIG. 4.

The washer 79 is in a press fit engagement on the stem 76 with a side 82 thereof engageable with the shoulder 73. As shown in FIG. 5, the washer has a central opening 85 for receiving the stem 76 and radially extended ribs 86 arranged in a criss cross fashion and projected outwardly from the side 82. The position of the washer axially of the stem 76 is defined by a shoulder 80 swaged in the stem and engageable with the washer 79 such that when the washer is yieldably engaged with the shoulder 73, the valve head 77 is in an open position providing for a free flow of air from the tire cavity 57 into the passage 62.

Figure 4:
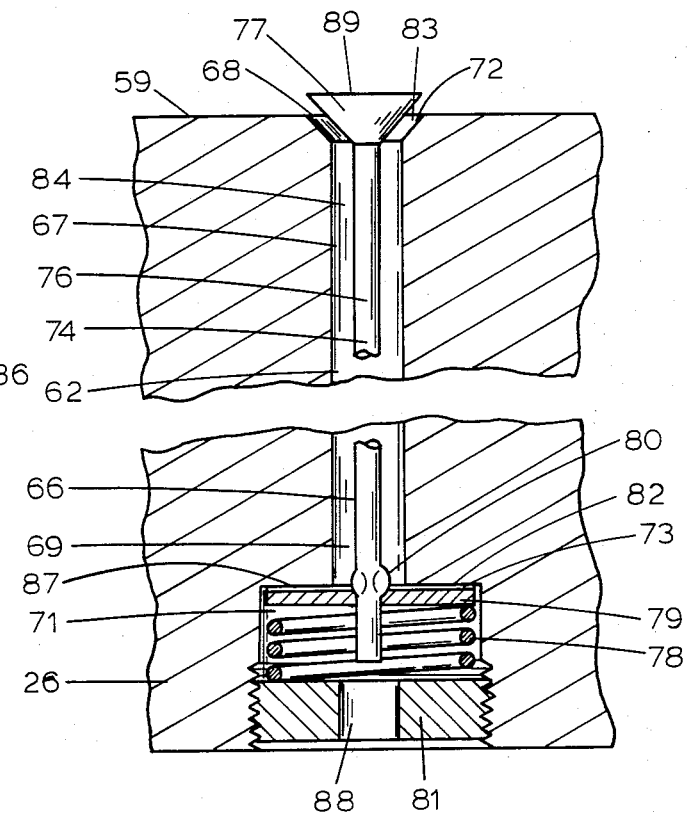
FIG. 4 is an enlarged longitudinal sectional view of a valve unit for a mold vent.

At the open position of the valve member 74, and as seen in FIG. 4, the annular space 83 formed between the valve seat 72 and valve head 77 and the annular space 84 formed between the stem 76 and inner peripheral surface of the passage 62, provide a continuous air passage way open to the tire cavity 57 (FIG. 3). With the valve member 74 in an open position, it is seen that air from the tire cavity 57 is permitted to travel freely through the space 83 and 84 and into the air channels or passages 87 formed by the ribs 86 between the shoulder 73 and the side 82 of the washer 79 for flow into the spring chamber 71, and then outwardly therefrom through a central outlet opening 88, formed in the plug 81, for discharge to the atmosphere through the passages 60 and 65.

In one embodiment of the invention, the passage 62 of a valve unit 66 has a diameter of 0.078 inches and the stem 76, a diameter of 0.047 inches. The valve head 77 has a circular top surface 89 with a diameter of 7/64 inches and a seating angle of 45° with the valve seat 72. The spring 78 is of a size and strength to apply a pressure of about 0.035 ounces per square inch. With the washer 79 in engagement with the shoulder 73, the valve head 77 is spaced about 0.020 inches from the side wall surface 59. In this embodiment, the valve member 74 is formed of aluminum and coated with a synergistic coating for improving erosion resistance, hardness and lubricity. This coating is provided by the General Magnaplate Corporation 1331 U.S. Route No. 1, Linden, N.J. 07036, as Nedox 406-plus.

In the use of the machine 15, and with the tire band 44 in a position to be expanded by the bladder 28, the upper mold member 22 is moved to its closing position with the lower mold member 26. Shaping steam at a pressure of about one hundred and eighty pounds per square inch is then admitted into the bladder 28 through the fluid pressure line 41. This steam pressure extends the bladder 28 (FIG. 3) to move or expand the tire band 44 toward conforming engagement with the cavity tread surface 58 and side surfaces 59. During this expansion, the tire band continuously moves air from within the tire cavity 57 through the open valve units 66 and into the air passages 61, 62 and 63. As the tire band approaches the cavity side surfaces 59, hot water at a temperature of about 370° F. and a pressure of about three hundred pounds per square inch is admitted into the bladder 28 through the fluid pressure line 41.

Since the valve head surfaces 89 are located about 0.020 inches from the cavity side surface 59, it is seen that the expelling of air from the tire cavity 57 takes place continuously with the valve units 66 in open position, and until the continuously expanding tire band engages the valve head surfaces 89. At such time, the valve units are progressively closed to in turn provide for a progressive decrease in the volume rate at which air is discharged from the cavity. The continuous expansion of the tire band is at a rate relative to the volume of air being expelled from the tire cavity 57 such that only a small portion of residual air remains in the cavity for discharge through the progressively closing valve units 66. The final shaping of the tire band 52 thus takes place in a substantial vacuum.

The closing of the valve members 74 is done by the expanding tire band 44 which functions as a valve actuator. Thus, as the expanding tire band moves into conforming engagement with the cavity side wall surface 59, the valve heads 77 are engaged and moved into seated engagement with the valve seat 72 against the pressure of the coil spring 78. When the expanding tire band 44 is in final conforming engagement with the cavity surface 59, the valves 74 are fully closed, at which time the valve head surfaces 89 form a smooth continuous surface with the tire cavity side surface 59, as shown in FIG. 7. The inclination of the passages 61, 62 and 63 laterally of the mold members 22 and 26 provides for the positioning of the valve head surfaces 89 in conformance with the side wall surfaces 59. As previously noted, the spring pressure acting to yieldably hold the valve members 74 in open positions is of a relatively small magnitude so that the valves are closed without the valve heads 77 forming any undesirable indentations within the formed tire side wall.

The tire band 44 remains in the final shaping station under the heat and pressure applied by the bladder 38 for a complete tire curing period after which cool water is supplied to the bladder for the fluid pressure line 41. This cooling water is drained from the bladder through the blow down or drain line 42 with the blow down operation taking place concurrently with movement of the upper mold member 22 to its open position. On completion of the blow down operation, the formed tire is manually removed from the machine. Concurrently with such removal, the valve units 66 are returned to their open positions by the springs 78.

Figure 8:
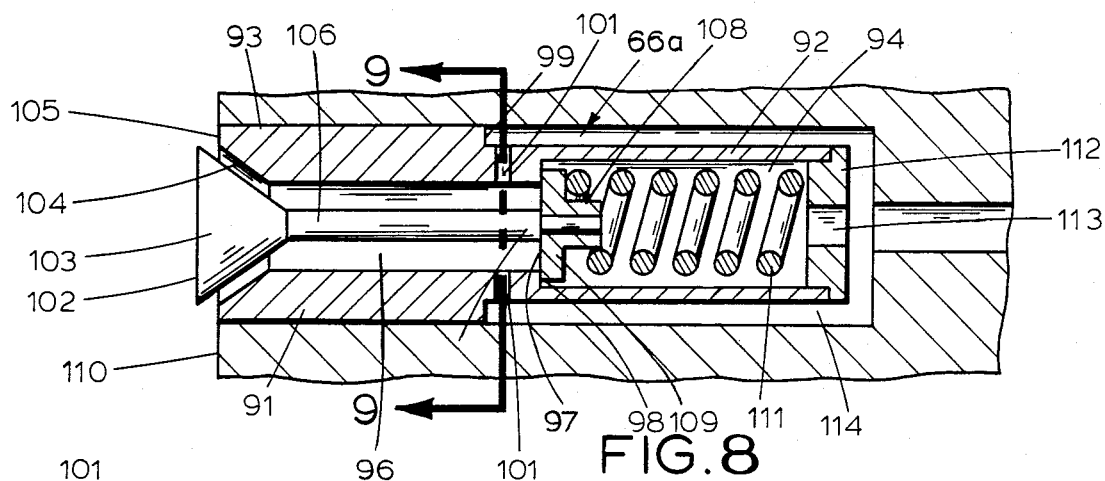
FIG. 8 is a modified form of the valve unit shown in FIG. 4, shown in assembly relation with a vented mold.
Figure 9:
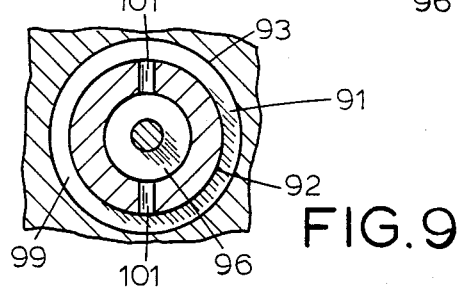
FIG. 9 is a detail sectional view taken on line 9—9 in FIG. 8.

Referring to FIG. 8, there is illustrated a modified form of the valve unit 66 shown in FIG. 4. A valve unit 66a is a unit assembly for insertion in a pressed fit within the cavity end of the mold vents 61a, 62a and 63a (FIG. 10) which are arranged in concentrically spaced rows in the cavity side walls 110. The valve unit 66a (FIG. 8) comprises a cylindrical body member 91 having an axial section 92 of a reduced diameter relative to the axial section 93, hereinafter to be referred to as small diameter section 92 and large diameter section 93, respectively. An axial bore in the body member 91 has a section of enlarged diameter 94 substantially coextensive in length with the small diameter body section 92. The remaining section 96 of the bore is of a reduced diameter and extends through the large diameter body section 93 with the inner end 97 terminating within the small diameter body section 92. The junction of the bore sections 94 and 96 forms a stop shoulder 98. The junction of the body sections 92 and 93 is defined by a shoulder 99. A pair of diametrically opposite radially extended air passages 101 are formed in the small diameter body section 92 adjacent the shoulder 99 for a purpose to appear later.

A valve member 102 has a head portion 103 movable into and out of a seated engagement with a valve seat 104 formed in the terminal or outer end face 105 of the large diameter body section 93. A valve stem 106 extends axially through the small bore section 96 with the free end 107 thereof projected into the large diameter bore section 94 for termination adjacent the stop shoulder 98. Mounted on the free end 107 of the valve stem 106 is a stop member 108 that has a disk portion 109 movable into abutting engagement with the stop shoulder 98 to limit or define the unseated position of the valve head 103 relative to the valve seat 104. When thus in abutting engagement it is seen that the disk 109 acts to close the inner end of the small diameter bore section 98 and restrict air flow to the radial air passages 101.

The stop member 108 is yieldably urged into abutting engagement with the stop shoulder 98 by a coil spring 111 arranged in compression between the stop member 108 and a plug 112 fitted within the outer end of the small diameter bore section 96, and formed with an axial opening or passage 113.

The vents 61a, 62a and 63a are present in most molds now in commercial use in tire forming machines, and such vents over the cavity end sections thereof are merely enlarged to receive therein the valve unit 66a.

Figure 10:
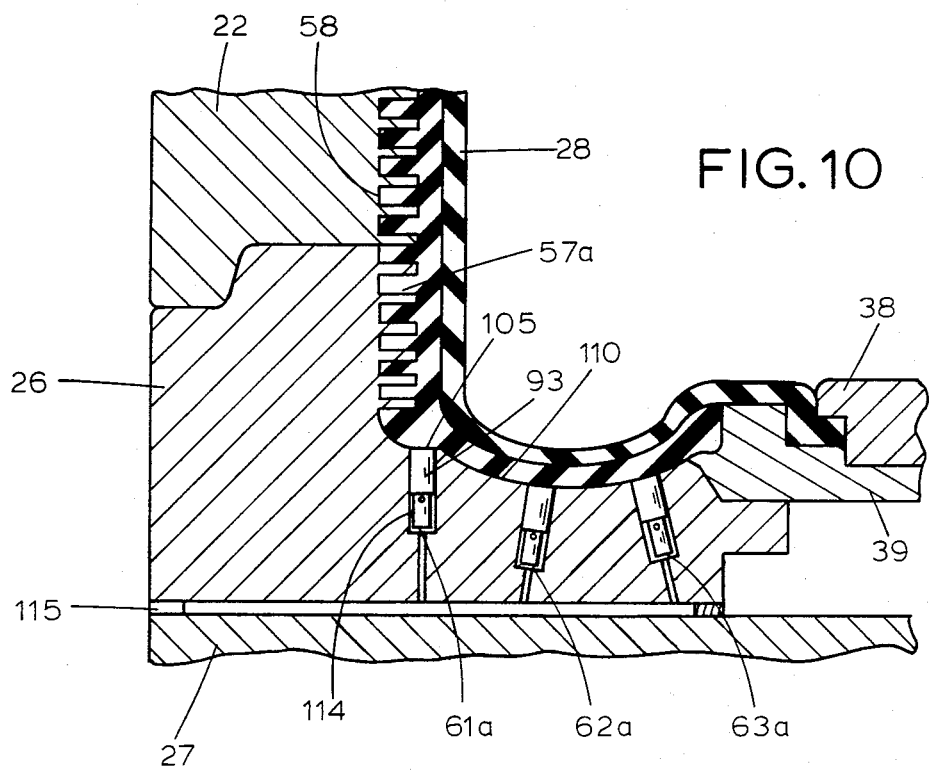
FIG. 10 shows the valve units of FIG. 8 in vent closing positions when the tire band is in a final expanded condition.

For assembly within a mold vent, the body member section 93 of the valve unit 66a, is inserted in a press fit engagement within the cavity end section of the vent to a position wherein the end face 105 forms a smooth and continuous surface with the inner surface of the cavity side wall 110 (FIG. 10). With the valve unit 66a thus assembled, it is seen that the outer peripheral surface of the small diameter body section 96 forms an annular air passage 114 with the inner peripheral surface of the vent 61a having one end open to the large diameter bore section 94 through the radial passages 101 and its opposite end open to the vent 61a inwardly of the body section 96.

With the valve head 103 in an open position (FIG. 8) it is seen that air from the tire cavity 57a is permitted to travel freely through the small bore section 96, radial passages 101 and annular passage 114 for discharge to the atmosphere at 115. It is apparent, of course, that if the stop member 108 is not in a full seated engagement with the stop shoulder 98 that air will also be permitted to flow about the stop member into the bore section 94 of large diameter and to the atmosphere through the passage 113 in the plug 112.

Thus, on expansion of the tire band 28 within the tire cavity 57a, air is continuously forced from the cavity about the valve head 103 and into the small bore section 94 for venting to the atmosphere through the passages 101 and 114 and/or about the stop member 108 and through the small diameter bore section 96 and plug passage 114. This continuous expulsion of air from the cavity continues until the tire band is in its final expanded condition wherein the outer surface thereof engages the exterior surface of the valve head 103 to move the valve head into seated position against the action of the coil spring 111. At this time the stop member 108 is moved out of abutting engagement with the stop shoulder 98 whereby air is permitted to flow freely through the bore sections 94 and 96. On removal of the completed tire from the tire cavity, the valve head 103 is automatically returned to its open position by the coil spring 111. In the closed position of the valve member 102, the exterior surface of the valve head 103 is flush with the end face 105 of the cylindrical body member 91 so as to form therewith a smooth, continuous surface with the inner surface of the cavity side wall.

In one form of the valve embodiment of FIG. 8, the large body section 93 has a diameter of 0.250 inches with a corresponding diameter of the small diameter body section of 0.218 inches. The cylindrical body member 91 has an overall length of 0.875 inches with an axial length of the large body section 93 of 0.500 inches. The axial movement of the valve member is about 0.031 inches against a pressure of the coil spring 111 of about 0.04 ounces per square inch.

Although the invention has been described with respect to a preferred embodiment thereof, it is to be understood that it is not to be so limited since changes and modifications can be made therein which are within the full intended scope of this invention as defined by the appended claims.

I claim:

1. A valve unit for the vent of a mold for forming a rubber product wherein vented mold sections form a closed cavity for receiving an expandable rubber body member for expansion from a normal non-distended condition to a final expanded condition, in which the outer surface of the body member is in full conforming engagement with the inner surface of the cavity side wall and wherein the vent is in a side wall of the cavity and open to the atmosphere, said valve unit comprising:

(a) a first vent section having one end terminating in said inner surface of the cavity side wall,
    (b) a valve seat at one end of said first vent section,
    (c) a second vent section open to the opposite end of said first vent section and to the atmosphere, said second vent section having defined end portions,
    (d) a valve member for opening and closing said vent including a stem portion located within and movable axially of said first vent section and a head portion movable to a vent closing position in seated engagement with said valve seat and to a vent opening position within said cavity and out of said seated engagement, said head portion, in the vent closing position therefor, having an exterior surface in smooth, continuous conformance with the inner surface of the cavity side wall, and
    (e) a coil spring means only in said second vent section engageable with said stem portion and arranged in compression between said defined end portions for yieldably urging said head portion to said vent opening position, said head portion exterior surface engageable by the outer surface of the expandable body member for movement thereby into said seated position in the final expanded condition of the body member to provide for a positive venting of air through the vent and to the atmosphere as the body member is expanded from the non-distended condition to the final expanded condition therefor.

2. A valve unit for an air vent open to the atmosphere and formed in the side wall of a mold that has an inner surface for conforming engagement with the outer surface of an expandable rubber body member which, on final expansion thereof, forms a molded article, said valve unit comprising:
- (a) a cylindrical member receivable in a press fit within the inner end of said vent with the outer end surface continuous with said side wall inner surface, said cylindrical member having an axial bore coaxial with said vent to form a section thereof,
- (b) a valve seat in said outer end surface of the cylindrical member and a spring receiving chamber means in said bore adjacent the inner end of the cylindrical member,
- (c) a valve member having a stem portion axially extended within said bore and a head portion movable to a first position in seated engagement with said valve seat, and to a second position projected from said outer end surface out of said seated engagement, said head portion in said first position having an exterior surface in smooth, continuous conformance with the inner surface of the mold side wall,
- (d) spring means only within said spring receiving chamber means engageable with said stem portion for yieldably urging said valve member to said second position of the head portion,
- (e) said head portion in the second position therefor being engageable and movable into said first position therefor by the outer surface of said expandable body member on final expansion thereof whereby to provide for a positive venting of air through the vent and to the atmosphere during the expansion of the outer surface of said body member into conforming engagement with the inner surface of said mold side wall,
- (f) coacting stop means on said valve member and cylindrical member for defining said second position of the head portion,
- (g) said cylindrical member having a first section of reduced diameter relative to a second section thereof, with said outer end surface of the cylindrical member constituting the terminal face of the second section thereof, whereby the peripheral surface of the first section and the inner peripheral surface of said vent form an annular passage means, and
- (h) said first section adjacent the junction thereof with the second section having at least one radially extended air passage therein open to said bore and to said annular passage means.

3. The valve unit according to claim 2, wherein:
- (a) said coacting stop means are within the bore of said first section of the cylindrical member, whereby air may be continuously moved from the bore in said second section through the radial passage and into said annular passage means for release to the atmosphere.

4. A valve unit for an air vent open to the atmosphere and formed in the side wall of a mold that has an inner surface for conforming engagement with the outer surface of an expandable body member which, on final expansion thereof, forms a molded article, said valve unit comprising:
- (a) a cylindrical body member receivable in a press fit within the inner end of said vent with the outer end surface continuous with said side wall inner surface, said cylindrical member having an axial bore coaxial with said vent to form a section thereof, said bore having a spring receiving chamber adjacent the inner end of said cylindrical member and a stem portion receiving chamber adjacent the outer end of said cylindrical member,
- (b) a valve seat in said outer end surface of the cylindrical member,
- (c) a valve member having a stem portion and a head portion; said stem portion axially extended within the stem portion receiving chamber, and said head portion movable to a first position in seated engagement with said valve seat and movable to a second position projected from said outer end surface out of said seated engagement, said head portion in said first position having an exterior surface in smooth, continuous conformance with the inner surface of the mold side wall,
- (d) spring means only within said spring receiving chamber and engageable with said stem portion for yieldably urging said valve member to said second position of the head portion,
- (e) coacting stop means on said valve member and within the spring receiving chamber for defining said second position of the head portion, said stop means, when the head portion is in the second position, constituting a wall for closing one end of said spring receiving chamber, and
- (f) passage means open to the stem portion receiving chamber and to the vent inwardly of said cylindrical member during the expansion of the outer surface of said expandable body member into contact with said head portion in the second position therefor, said head portion in the second position therefor being movable into said first position therefor by the outer surface of said body member on final expansion thereof.

5. The valve unit according to claim 4, wherein:
- (a) said passage means includes a passageway in air communication with the atmosphere and the stem portion receiving chamber.

6. The valve unit according to claim 4, wherein:
- (a) said cylindrical member has an inner first section of reduced diameter relative to an outer second section thereof, and
- (b) said passage means includes an annular passageway formed by the peripheral surface of the inner first section and the inner peripheral surface of said vent, and at least one radially extended air passageway open to said stem portion receiving chamber and said annular passageway, whereby said stem portion receiving chamber is open to the atmosphere.

7. The valve unit according to claim 6, wherein:
- (a) said coacting stop means are within the spring receiving chamber at the junction thereof with said stem portion receiving chamber, whereby air may be expelled from the stem portion receiving chamber in said second section through the radial air passageway and into the annular passageway for release to the atmosphere.

* * * * *